A. CONGER.

UNDERSHIRT.

No. 10,378. Reissued Sept. 4, 1883.

WITNESSES:

Otto Hufeland

William Miller

INVENTOR

Alfred Conger

BY Van Santvoord & Hauff

ATTORNEYS

N. PETERS, Photo-Lithographer, Washington, D. C.

UNITED STATES PATENT OFFICE.

ALFRED CONGER, OF ELIZABETH, NEW JERSEY.

UNDERSHIRT.

SPECIFICATION forming part of Reissued Letters Patent No. 10,378, dated September 4, 1883.

Original No. 146,656, dated January 20, 1874. Application for reissue filed December 13, 1882.

*To all whom it may concern:*

Be it known that I, ALFRED CONGER, a citizen of the United States, residing at Elizabeth, in the county of Union and State of New Jersey, have invented a new and useful Improvement in Undershirts, of which the following is a specification.

This invention consists in a knitted or flannel undershirt with an open back and closed front, the front being provided with a sanitary chest-protector applied thereto in such a manner that the breast of the person wearing the shirt is effectually protected against cold drafts or winds, and if the front of the shirt be ornamented it will be especially adapted for wear without the usual over or linen shirt.

Figure 1:
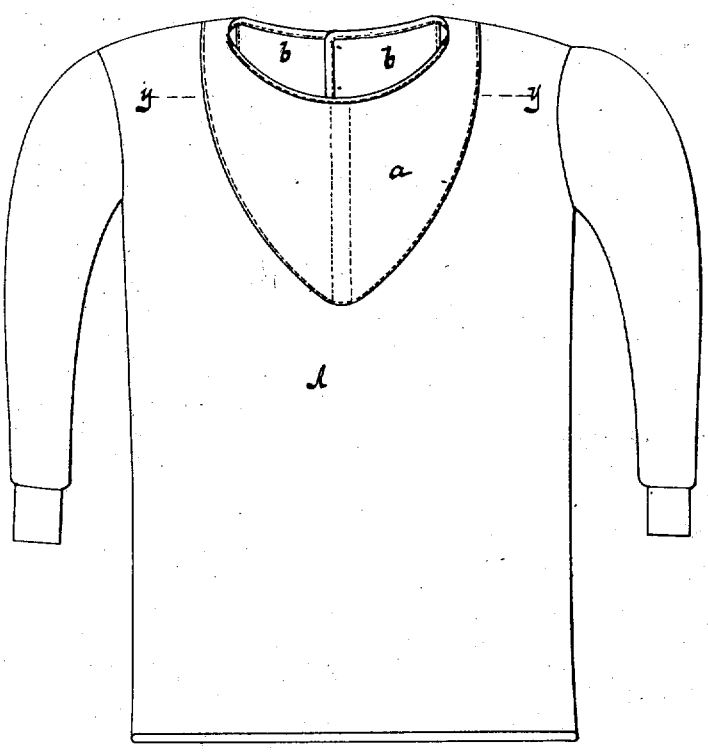
Figure 2:
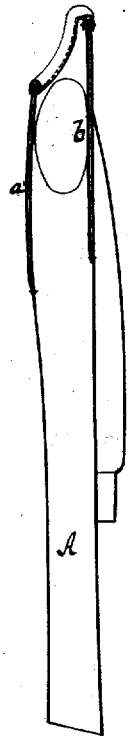
Figure 3:
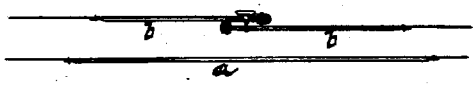

This invention is illustrated in the accompanying drawings, in which Figure 1 represents a front view. Fig. 2 is a transverse section in the plane *x x*, Fig. 1. Fig. 3 is a horizontal section in the plane *y y*, Fig. 1.

Similar letters indicate corresponding parts.

In the drawings, the letter A designates a knitted or flannel undershirt made with an open back, and provided with buttons or other suitable fastenings on said open back, whereby it can be closed. The front of this shirt is closed, and it is provided with a sanitary chest-protector, *a*, which serves effectually to exclude drafts of air and to keep the breast of the person wearing the shirt warm. Said chest-protector may be made of a material different from that of which the shirt is made.

The front of this undershirt may be suitably ornamented, so that it can be worn without an overshirt, since the addition of the chest-protector will shield the chest and compensate for the warmth of an outside shirt.

If the shirt is made of knitted fabric, the chest-protector may be produced by suitable machinery simultaneously with the other portions of the shirt; but if the shirt is made of flannel the chest-protector will be sewed permanently upon the closed front. On each side of the opening in the back is secured a protector, *b*.

What I claim as new, and desire to secure by Letters Patent, is—

As a new article of manufacture, an undershirt formed with an open back and closed front, and provided with a chest-protecting piece, *a*, all constructed in the manner herein described.

In testimony whereof I hereunto set my hand and seal in the presence of two subscribing witnesses.

ALFRED CONGER. [L. S.]

Witnesses:

W. HAUFF,

E. F. KASTENHUBER.